May 28, 1929.   J. HARTNESS   1,714,780
GAUGE FOR SCREW THREADS
Filed Nov. 18, 1927
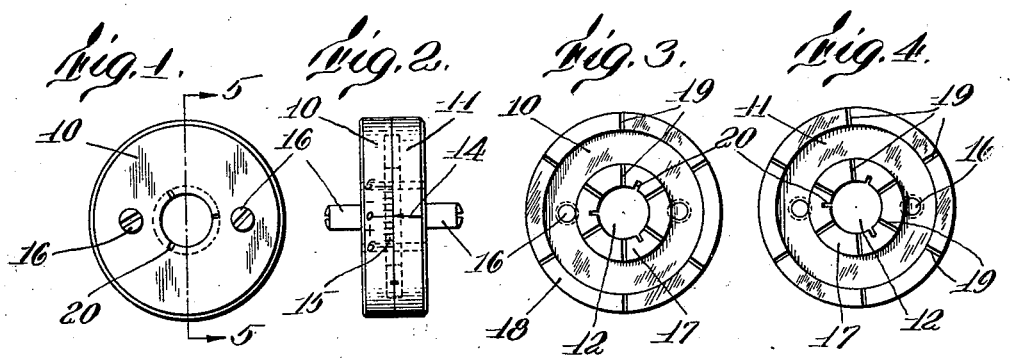
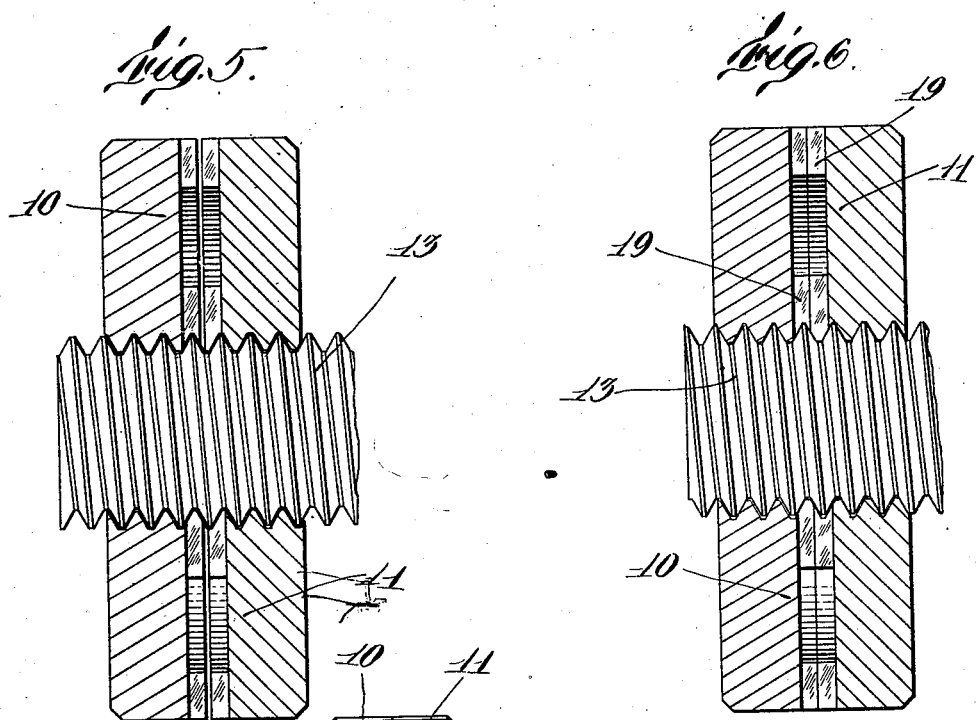
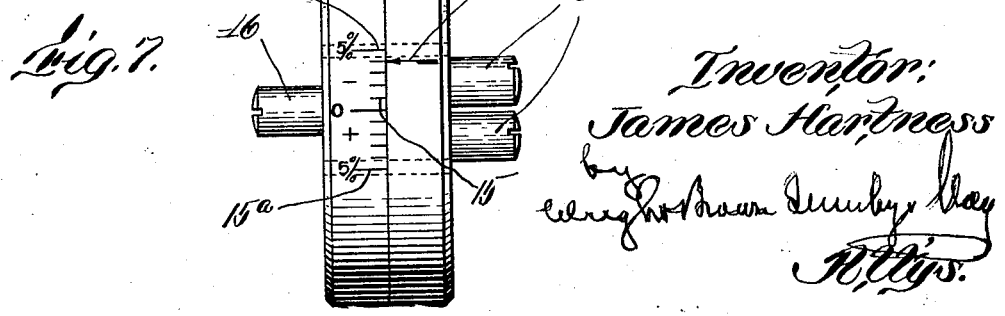
Inventor:
James Hartness Patented May 28, 1929.

1,714,780

UNITED STATES PATENT OFFICE.

JAMES HARTNESS, OF SPRINGFIELD, VERMONT.

GAUGE FOR SCREW THREADS.

Application filed November 18, 1927. Serial No. 234,115.

This invention relates to a gauge for testing the flank thickness of screw threads having a correct lead. An object of the invention is to provide a gauge which is simple, compact and easily manipulated. The gauge embodying the prevent invention comprises essentially a pair of gauging members which may be in the shape of disks, each having an axially threaded perforation therethrough, the threads being cut to receive a screw having a pitch diameter preferably somewhat larger than the maximum limit of tolerance. The two disks are each provided with a contacting face presented for engagement with each other, and their combined thickness or axial length is preferably equal approximately to that of a standard nut for a screw of corresponding diameter. The principle upon which the gauge operates is as follows:

If the two disks be held together in face-to-face engagement and in axial alinement, the threads in each may be brought to lie in a common helix by rotating the disks relatively to each other to a certain position. When the disks are held in this position, a threaded member to be tested may be screwed through the alined apertures of the disks. If the disks are now rotated in opposite directions so as to cause them to tend to advance toward each other on the thread of the member to be tested, this tendency to move toward each other will result in a reactive pressure of one flank of the thread of each disk against a flank of the screw thread so that the contacting faces of the disks will be pressed tightly together. If the flanks of the screw thread to be gauged are less than normal at the standard pitch line, a greater amount of relative rotation of the disks will be required to reach the limiting position in which their contacting faces are tightly pressed against each other and their internal threads are jammed against the threads of the screw. If the flanks of the screw threads are thicker than normal on the standard pitch line, the two disks will jam against each other and the screw threads with a lesser amount of relative rotation. Assuming that there is no lead error in the screw to be tested, the angle of relative rotation of the disks on the screw is an indication of the flank thickness of the screw at the standard pitch line, the measurement being taken over a considerable length of screw thread, since the disks are preferably of sufficient thickness to contain a plurality of turns of thread. The gauge may be calibrated, if desired, to indicate errors of flank thickness in terms of pitch diameter.

For a more complete understanding of the invention, reference may be had to the following description and to the drawing, of which,—

Figure 1 is an elevation of a gauge embodying the invention.

Figure 2 is an edge view of the same.

Figures 3 and 4 are elevations of the inner or contacting faces of the separate members of the gauge.

Figure 5 is a section on the line 5—5 of Figure 1, drawn to a larger scale.

Figure 6 is a section similar to Figure 5, showing the disks in a limiting relative position taken in the use of the gauge in testing a screw.

Figure 7 is an edge view of the gauge, showing the parts in the same relative angular position as they appear in Figure 6.

Referring to the drawing in detail, the gauge illustrated therein comprises essentially two centrally perforated disks 10 and 11, which are almost identical in general shape and structure, each disk having a contacting face to present to the other disk, and a threaded perforation 12 extending axially therethrough, the threads being of the same size and pitch. It is obvious that when the two disks are placed coaxially in face-to-face engagement, there is one position of angular relation wherein the threads in the two apertures will lie in a common helix. When the threads are thus related, a threaded element to be tested may be screwed through the perforations 12 of the disks. Since the disks are separate and there is no connection between them, it is obvious that they may be screwed individually onto a threaded element to be tested. If the disks 10, 11 are then rotated in opposite directions relatively to each other so as to advance toward each other, when their contacting faces meet, their threads will soon bring up against opposite flanks of the thread of the screw being tested, as shown in Figure 6. In order to indicate the relative angular position assumed by the disks when they have been turned until their contacting faces are jammed together by the reactive pressure of the threads against the thread of the screw, suitable marks may preferably be made on the peripheral face of the disks. As shown, these marks may consist of an index 14 on one of the disks and a series of scale marks 15 on the other disk to cooperate with the index 14, and to indicate desired tolerance limits. The tolerance in either direction from standard may for example be equivalent to five scale divisions as illustrated in Figure 7, the boundaries of tolerance being indicated at 15ª, 15ª. The index 14 thus indicates not only whether a screw is within the chosen limits of tolerance, but also how nearly a screw approaches in diameter a tolerance limit. The marks are preferably so arranged that correct flank thickness is indicated when the index is opposite the zero mark. This may be determined by screwing the disks onto a threaded plug having an accurate standard thread of correct size for the gauge, then jamming the disks together on the plug, and making a zero scale mark opposite to the index. In order to permit the operator to jam the disks together with considerable pressure so as to press down microscopic inequalities on the flank surfaces of the screw thread and thus to approximate service conditions under which the screw is to be used, suitable handles 16 may be provided projecting from the outer faces of the disks as shown or if preferred from the rims of the disks. Any other equivalent means, such as knurled or grooved surfaces on the rims of the disks, may also be employed with or instead of the handles 16.

In order to minimize the possibility of incorrect measurements due to the catching of dust or other foreign matter between the contacting faces of the disks, a portion of each contacting face may be cut away so that each disk will present to the other a relatively narrow circular portion 17 surrounding the threaded aperture 12 and if desired, an additional relatively narrow circle of contacting face 18 adjacent to the rim of the disk. These faces may be provided with small transverse channels 19 to catch dirt or foreign matter which may be caught between the contacting surfaces as the disks are brought together. For a similar purpose, narrow channels 20 may be cut across the threads of the perforations 12.

In using the gauge, it may be first tested, if desired, by screwing it on to a master plug which has an accurate standard thread of the proper size to correspond to the gauge. The disks are then jammed against each other by relative rotation and the index 14 should then be directly opposite the zero scale mark of the scale 15. The master plug is then removed from the gauge and a screw to be tested is inserted therein. If, for example, the thread flanks of the screw are thinner than normal, the disks must be turned through a greater angle before they are stopped by jamming. Thus, for example, as shown in Figure 7, the index 14 will turn beyond the zero mark on the scale 15. The scale may be calibrated in terms of variations of flank thickness or pitch diameter as desired, positive and negative signs being employed to indicate whether the flank thickness is greater or less than standard.

Having thus described certain embodiments of this invention, it should be evident to those skilled in the art that various changes and modifications might be made therein without departing from its spirit or scope as defined by the appended claims.

I claim:

1. A gauge comprising a pair of separate unconnected gauging members, each having an axial threaded perforation, the threads being so formed as to lie in a common helix when the members are coaxially alined in face-to-face contact and in a certain angular relation, there being cooperating marks on said members to indicate relative angular adjustment thereof.

2. A gauge comprising a pair of separate unconnected disks, each having an axial threaded perforation, the threads being so formed as to lie in a common helix when the disks are coaxially alined in face-to-face contact and in a certain angular relation, each disk presenting to the other for engagement an inner contact area surrounding its threaded perforation and an outer circular contact area adjacent the periphery of the disk and spaced from the inner area, and means for indicating the relative angular adjustment of the disks.

3. A gauge comprising a pair of separate unconnected disks, each having an axial threaded perforation, the threads being so formed as to lie in a common helix when the disks are axially alined in face-to-face engagement and in a certain angular relation, each disk presenting for contact by the other an inner circle of area adjacent to said perforation surrounded by an area of non-contacting surface, said threads and said contacting area having radial dirt-collecting channels extending thereacross, and means for indicating the relative angular adjustment of the two disks.

4. A gauge comprising a pair of separate unconnected disks, each having an axial threaded perforation, the threads being so formed as to lie in a common helix when the disks are axially alined in face-to-face contact and in a certain angular relation, there being an index on the rim of one of said disks, scale marks on the rim of the other disk cooperating with said index to indicate the relative angular adjustment of said disks, and means on said disks for facilitating relative rotation thereof.

5. A gauge comprising a pair of separate unconnected disks having a combined axial length approximately equal to that of a standard nut for a screw of corresponding diameter, each disk having an axial threaded perforation therethrough of a size to receive a screw having a pitch diameter somewhat greater than the maximum limit of tolerance, the threads being so formed as to lie in a common helix when the disks are arranged coaxially alined in face-to-face contact and in a certain angular relation, and cooperating marks on said disks to indicate relative angular adjustment thereof.

In testimony whereof I have affixed my signature.

JAMES HARTNESS.